United States Patent
Wu

(10) Patent No.: US 7,579,816 B2
(45) Date of Patent: Aug. 25, 2009

(54) SINGLE FEEDBACK INPUT FOR REGULATION AT BOTH POSITIVE AND NEGATIVE VOLTAGE LEVELS

(75) Inventor: Albert Mien-Yee Wu, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 211 days.

(21) Appl. No.: 11/348,367

(22) Filed: Feb. 7, 2006

(65) Prior Publication Data

US 2007/0183173 A1    Aug. 9, 2007

(51) Int. Cl.
  *G05F 1/00*    (2006.01)
(52) U.S. Cl. ........................ 323/282; 323/271
(58) Field of Classification Search .......... 323/282, 323/283, 284, 285, 351, 267, 273; 307/24, 307/28, 31, 32
See application file for complete search history.

(56) References Cited

U.S. PATENT DOCUMENTS

| | | | | |
|---|---|---|---|---|
| 3,502,896 A | * | 3/1970 | Langkamp | 307/31 |
| 3,571,604 A | * | 3/1971 | La Porta et al. | 307/24 |
| 4,395,675 A | * | 7/1983 | Toumani | 323/271 |
| 4,585,986 A | * | 4/1986 | Dyer | 323/271 |
| 5,438,258 A | * | 8/1995 | Maruyama | 324/142 |
| 5,589,761 A | * | 12/1996 | Nelson et al. | 323/285 |
| 5,821,806 A | * | 10/1998 | Pascucci | 327/538 |
| 5,912,552 A | * | 6/1999 | Tateishi | 323/285 |
| 6,531,853 B2 | * | 3/2003 | Umemoto | 323/282 |
| 7,005,835 B2 | * | 2/2006 | Brooks et al. | 323/282 |
| 7,064,497 B1 | * | 6/2006 | Hsieh | 315/246 |
| 2005/0116698 A1 | * | 6/2005 | Prinz et al. | 323/283 |

* cited by examiner

*Primary Examiner*—Edward Tso
*Assistant Examiner*—M'Baye Diao
(74) *Attorney, Agent, or Firm*—McDermott Will & Emery LLP

(57) ABSTRACT

A voltage regulator provides a regulated output load voltage at either a positive level or an inverted level relative to an input supply voltage. A switching circuit and control circuit are formed on an integrated circuit having a single pin for coupling to regulator feedback signal. The feedback signal is applied directly to the feedback pin during both positive voltage level regulation and inverted voltage level regulation. The feedback signal may be produced by a feedback circuit comprising an impedance element formed in the integrated circuit.

17 Claims, 7 Drawing Sheets

SINGLE FEEDBACK INPUT FOR REGULATION AT BOTH POSITIVE AND NEGATIVE VOLTAGE LEVELS

TECHNICAL FIELD

The present disclosure relates to control of a voltage regulator, more particularly to a regulator that can be operated for positive or inverted voltage level regulation with the same feedback configuration.

BACKGROUND

Voltage converters are known that provide regulated output load voltages at levels above, at, or below nominal input supply voltages at the same or inverted polarity. Diagrams of two such known converters are broadly shown in FIGS. 1A and 1B. FIG. 1A depicts a step-up, or boost, converter that includes an integrated circuit switching regulator such as, for example, the LT1930 produced by Linear Technology. FIG. 1B depicts an inverting converter that includes a switching regulator such as, for example, the LT1931 produced by Linear Technology, or equivalent. In each device, the switching regulator and control circuit therefor are incorporated in an integrated circuit chip 10, which has a plurality of pins formed thereon for interfacing with external elements.

Each converter comprises an input capacitor 12, coupled between voltage supply input node $V_{IN}$ and ground, and an output capacitor 14 coupled between output node $V_{OUT}$ and ground. The output node is coupled to a load to provide regulated voltage thereto. Resistors 16 and 18 are coupled in series between the output node and ground. The junction between resistors 16 and 18 provides a feedback voltage that is proportional to the load voltage.

The conversion functionality is dependent upon the configuration of the external elements and their connections with the pins of chip 10. In the boost converter of FIG. 1A, inductor 20 and diode 22 are coupled in series between the $V_{IN}$ and $V_{OUT}$ nodes. The junction between inductor 20 and diode 22 is coupled to a switch internal to the chip 10 via a pin SW. The feedback voltage is coupled to a switch control circuit internal to the chip 10 via a pin FB. In the inverting converter of FIG. 1B, inductor 20 capacitor 24 and inductor 26 are coupled in series between the $V_{IN}$ and $V_{OUT}$ nodes. Diode 22 is coupled between the junction of capacitor 24 and inductor 26 and ground. Capacitor 28 is coupled in parallel with resistor 16. The feedback voltage is coupled to via a pin NFB.

The integrated circuit chip 10 for both converters comprises similar, well-known, circuitry. FIG. 2 is a partial block diagram that illustrates chip elements to the left of the dashed line area and typical external regulator elements represented by block 15. Signal responsive switch 30 and resistor 32 are connected in series between inductor 20 and ground. The switch current $I_{SW}$ is sensed at the junction between switch 30 and resistor 32. Switch 30 is controlled by circuit 34. When switch 30 is in a conductive state, current flows from source $V_{IN}$ through inductor 20 and resistor 32 to ground. When the switch is turned off, energy stored in the inductor is transferred to the capacitor 14. By appropriately timing the on and off states of the switch 30, a regulated boost voltage is maintained at the output node of capacitor in the configuration of FIG. 1A, or a regulated inverted voltage is maintained at the output node of capacitor in the configuration of FIG. 1B.

Switching control circuit 34 typically comprises latch circuitry and switch driver circuitry. A set input is coupled to clock 36, which may generate pulses in response to an oscillator. During normal operation, the latch is activated to initiate a switched current pulse when the set input receives each clock pulse. The switched current pulse is terminated when the reset input receives an input signal, thereby determining the width of the switched current pulse. The reset input is coupled to the output of comparator 38. For boost regulation, output voltage feedback signal $V_{FB}$ is coupled to a negative input of error amplifier 40. A voltage reference $V_{REF}$ is applied to the positive input of error amplifier 40. Capacitor 42 is coupled between the output of error amplifier 40 and ground.

The level of charge of capacitor 42, and thus its voltage $V_C$, is varied in dependence upon the output of amplifier 40. As load current increases, the output voltage, and thus $V_{FB}$, decreases. As the feedback voltage $V_{FB}$ decreases, $V_C$ increases. Thus, $V_C$ is proportional to load current. $V_C$ is coupled to the inverting input of comparator 38. The non-inverting input is coupled to adder 44. Adder 44 combines signal $I_{SW}$, which is proportional to the sensed switch current, with a compensation signal. Upon switch activation in response to a clock set signal, switch current builds through inductor 20. When the level of the signal received from adder 44 exceeds $V_C$, comparator 38 generates a reset signal to terminate the switched current pulse. During heavier loads, $V_C$ increases and the switched current pulse accordingly increases in length to appropriately regulate the output voltage $V_{OUT}$ at the boost level. Such operation is typical current mode control. Alternatively, duty cycle can be regulated in voltage mode control.

In the boost configuration of FIG. 2, the output voltage is a positive level and the positive feedback voltage $V_{FB}$ is applied to the FB pin, shown in FIG. 1A. For an inverting converter, the output voltage is a negative level and the negative feedback voltage $V_{FB}$ is applied to the NFB pin, shown in FIG. 1B. The feedback voltage is then changed in sign to a positive value and applied to the negative input of error amplifier 40. Thus the elements, of a single integrated circuit chip, shown in FIG. 2, can be made operable for both boost and inverting regulation.

Traditional methods for implementing a single integrated circuit chip for use in either a boost or inverting voltage converter require the use of two or three pins of the chip. One conventional method is illustrated in FIGS. 3A-3C. FIG. 3A depicts chip 10 with pins A, B and C illustrated. Pin A is permanently connected to voltage reference $V_{REF}$, supplied by an external source. Pin B is connected internally to the positive input of error amplifier 40. Pin C is connected internally to the negative input of error amplifier 40. Additional connections are made externally to pins A, B and C to provide for the boost regulation configuration, as illustrated in FIG. 3B, or the inverting regulation configuration, as illustrated in FIG. 3C.

In the FIG. 3B arrangement, pins A and B are connected together externally. Thus $V_{REF}$ is applied to the positive input of error amplifier 40. Feedback voltage $V_{FB}$, from the junction of resistors 16 and 18 is applied to the negative input of error amplifier 40 via pin C. This configuration is the same as that illustrated in FIG. 2. The output of error amplifier 40 will vary in accordance with the output load and the switch 30 is controlled accordingly.

In the FIG. 3C arrangement, pin C is connected externally to ground. Pin B is connected externally to the junction between resistors 16 and 18. Resistors 16 and 18 are coupled in series across $V_{REF}$, at resistor 16, and $-V_{OUT}$, at resistor 18. When the load increases, the absolute value of $V_{OUT}$ decreases, and thus the $V_C$, output of error amplifier 40, increases. The conductive period of the switch 30 is controlled to vary in accordance with load current in the same manner as in the boost operation.

Another known method for boost conversion and inverting conversion implementation is illustrated in FIGS. 4A-4C. FIG. 4A depicts chip 10 with pins A and B illustrated. Pin A is connected internally to the negative input of error amplifier 40. The positive input of error amplifier 40 is connected internally to ground. The output of error amplifier 40 is connected to the negative input of error amplifier 41 through diode 43. Pin B is connected internally to the negative input of error amplifier 41. The positive input of error amplifier 41 is connected to $V_{REF}$, which may be generated internally within chip 10. The output of error amplifier 41 produces voltage $V_C$.

FIG. 4B illustrates the external connections to pins A and B for the arrangement shown in FIG. 4A for boost converter operation. Pin A is externally connected to the junction of resistors 16 and 18, which produces the feedback voltage $V_{FB}$. Pins A and B are connected, externally, to each other. With this configuration, the feedback voltage $V_{FB}$ is applied to the negative input of error amplifier 41 with $V_{REF}$ applied at the positive input. $V_C$ is output to vary with load, as in the operation of FIG. 2, described above.

FIG. 4C illustrates the pin connections of the FIG. 4A arrangement for inverting operation. Pin A is externally connected to the junction of resistors 16 and 18, which produces the feedback voltage $V_{FB}$. Pin B is connected externally to the other end of resistor 18. As $V_{OUT}$ has negative polarity in inverting operation, $V_{FB}$ is negative. Error amplifier 40 produces a positive output, which is applied via diode 43 to the negative input of error amplifier 41. The absolute value of feedback voltage $V_{FB}$, increases for lighter load currents and decreases for heavier load currents. When the input to pin A becomes more negative (lighter load), the output of error amplifier 40, applied to the negative input of error amplifier 41, increases to decrease the output $V_C$ of error amplifier 41. Thus $V_C$ varies in correspondence with the increase and decrease of load current to obtain the same manner of regulation of switch 30 as in the operation of FIG. 2, described above.

The known arrangements require dedication of a plurality of IC pins to be externally reconfigured for operation as both boost and inverting conversion. The arrangement of FIGS. 3A-3C utilizes a single error amplifier, a permanent external connection of pin A to the reference voltage, and a reconfiguration of external connections to pins A through C when changing between boost and inverting converter operation. The arrangement of FIGS. 4A-4C utilizes two error amplifiers but still requires two pins for circuit reconfiguration when changing between boost and inverting converter operation. A need still exists for an integrated circuit switching regulator that needs no internal change for operation at either boost of inverting conversion while minimizing the number of pins needed to reconfigure operation.

SUMMARY OF THE DISCLOSURE

The subject matter described herein fulfills the above-described needs of the prior art. In one aspect, a voltage regulator can be configured to provide a regulated output load voltage at either a positive level or an inverted level relative to an input supply voltage. A feedback signal is derived that varies with load voltage. A control signal is generated that is variable proportionately with load current and is applied to control a switching circuit of the regulator. To generate the control signal, a control current is supplied from a current source to a control circuit of the switching circuit. The supplied current is diverted from the control circuit when the voltage of the feedback signal is greater than a positive reference voltage and when the voltage of the feedback signal is less than ground voltage. The switching circuit and the control circuit are formed on an integrated circuit having a single feedback pin. The feedback signal is applied directly to the feedback pin during both positive voltage level regulation and inverted voltage level regulation. The feedback signal may be produced by a feedback circuit comprising an impedance element formed in the integrated circuit.

Additional aspects and advantages will become readily apparent to those skilled in this art from the following detailed description, wherein only the preferred embodiments are shown and described, simply by way of illustration of the best mode contemplated of carrying out the invention. As will be realized, the disclosed concepts are applicable to other and different embodiments, and the disclosed details are capable of modifications in various obvious respects. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 1A:
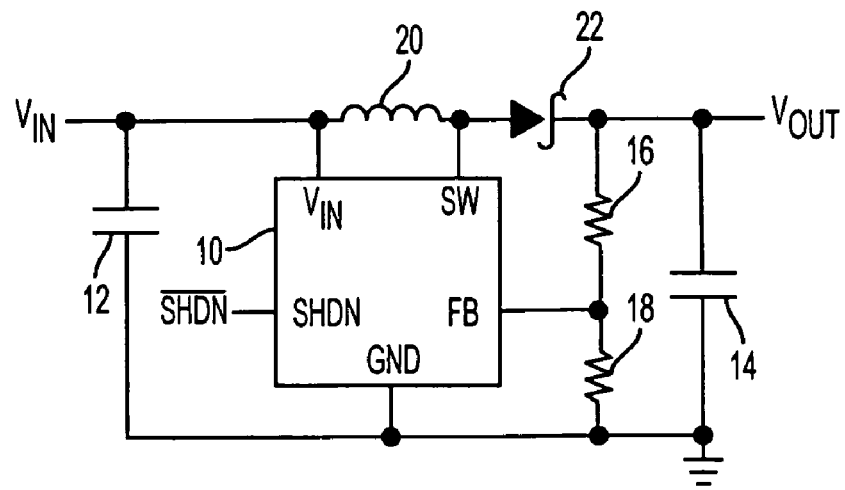
FIGS. 1A and 1B are diagrams of a known voltage regulator that can be configured as shown, respectively, for boost or inverting voltage regulation.
Figure 1B:
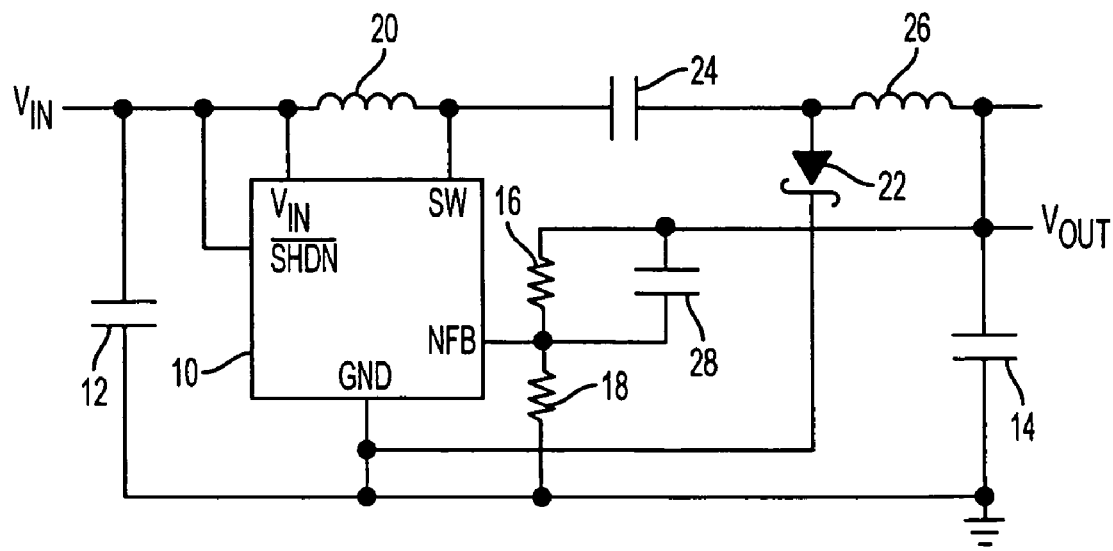
Figure 2:
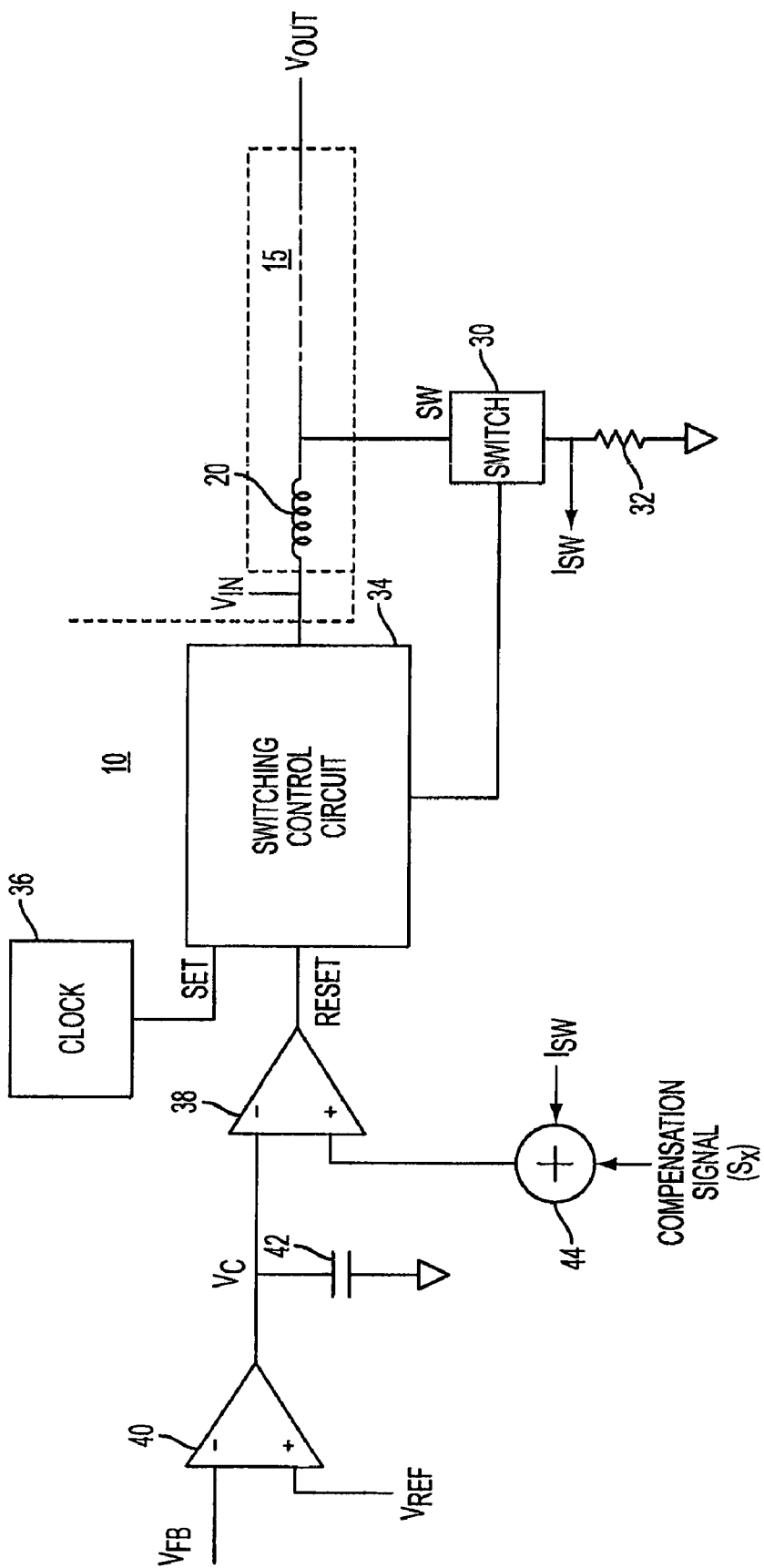
FIG. 2 is a partial block diagram that illustrates typical regulator elements that may be utilized in the voltage regulator of FIGS. 1A and 1B.
Figure 3A:
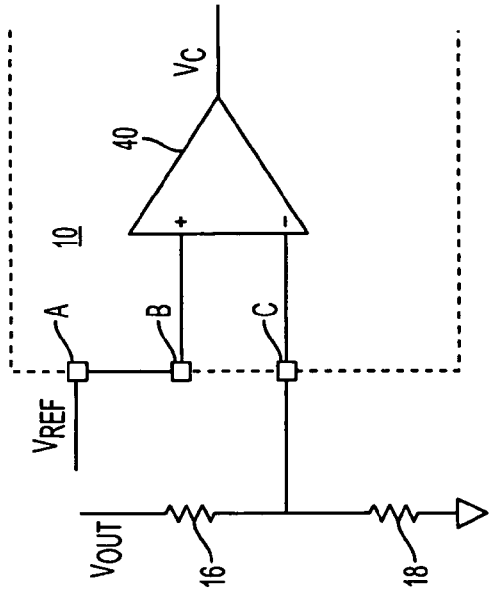
FIGS. 3A-3C are partial diagrams illustrative of a known method for implementing a single integrated circuit chip for use in either a boost or inverting voltage converter.
Figure 3B:
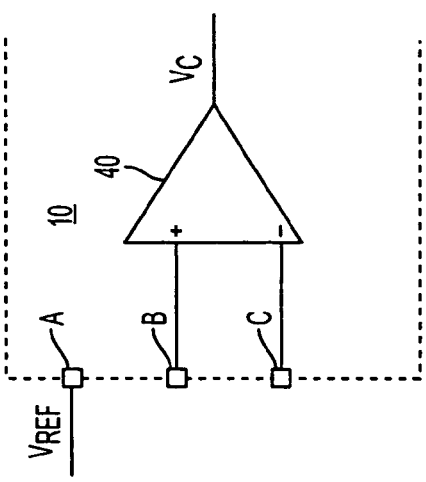
Figure 3C:
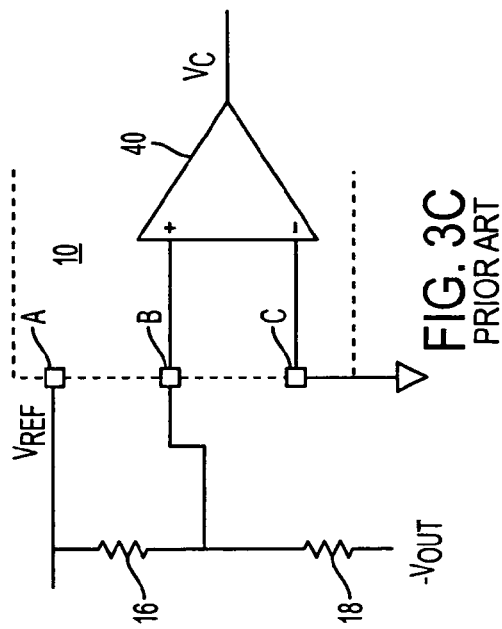
Figure 4B:
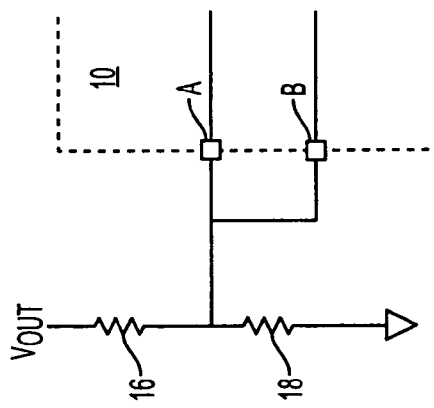
FIGS. 4A-4C are partial diagrams illustrative of another known method for implementing a single integrated circuit chip for use in either a boost or inverting voltage converter.
Figure 4C:
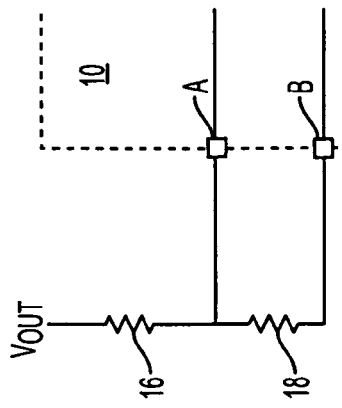
Figure 4A:
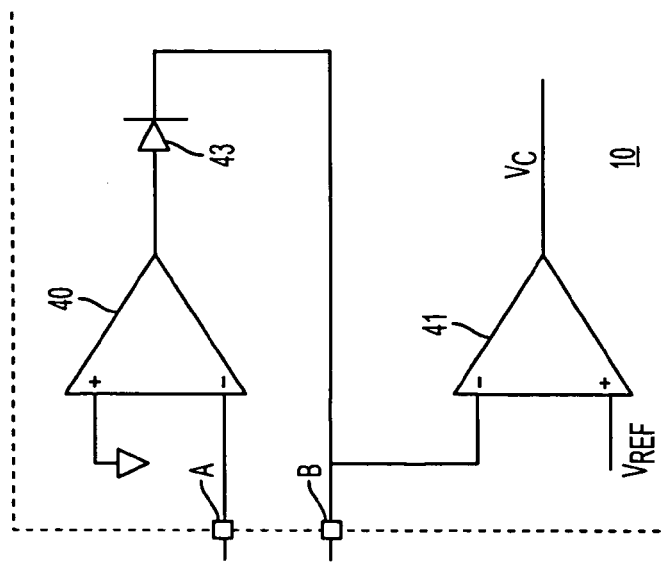
Figure 5:
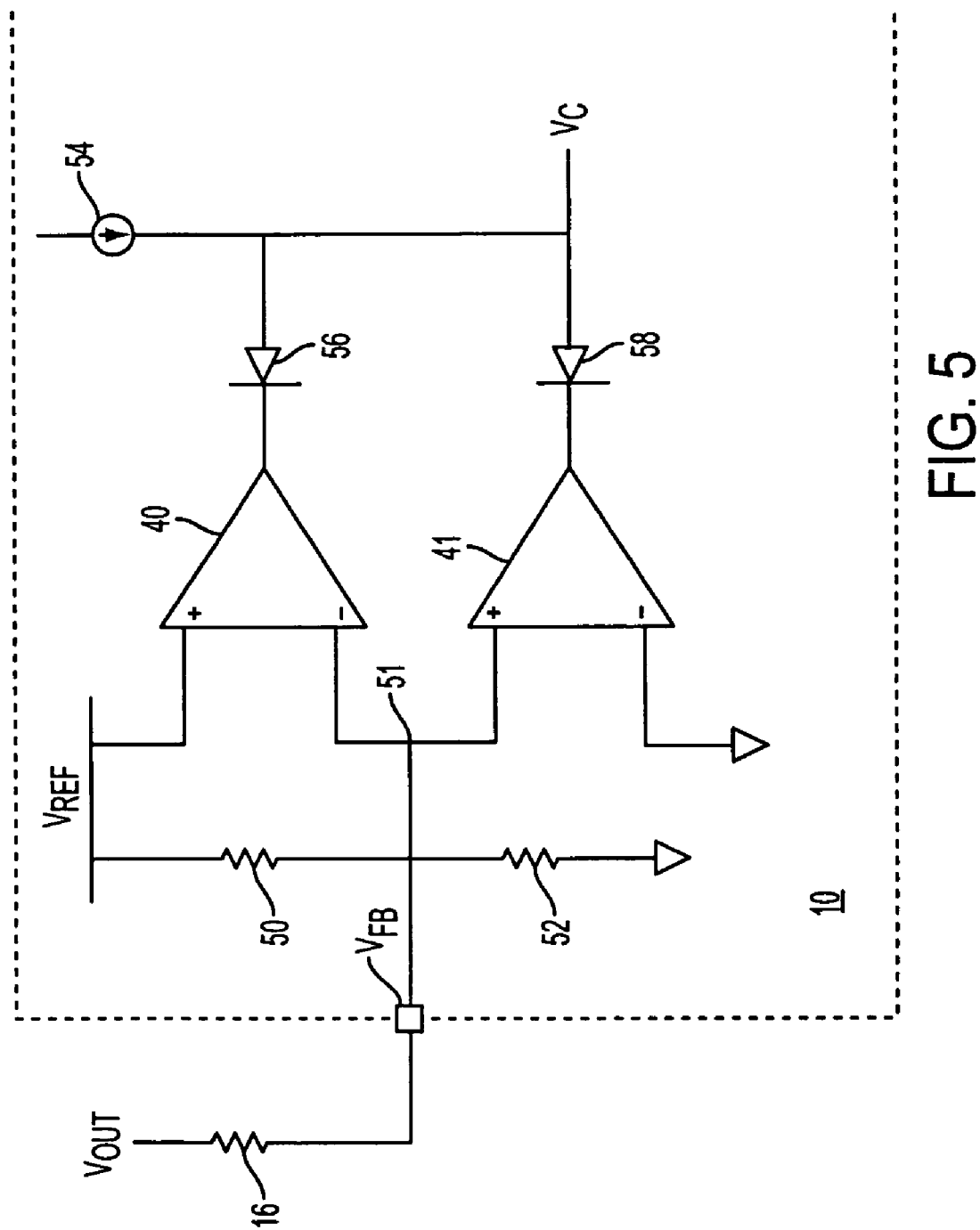
FIG. 5 is a partial circuit diagram of a feedback control scheme for a voltage regulator capable of boost or inverting voltage conversion illustrative of the disclosed concepts.

The feedback control scheme illustrated in FIG. 5 is implemented in an integrated circuit chip 10, indicated within the dash line border. Output voltage $V_{OUT}$ is coupled via feedback resistor 16 to a chip pin to apply the feedback voltage $V_{FB}$ thereto. The remainder of the elements illustrated are formed in the integrated circuit. Coupled in series between an internally generated voltage reference $V_{REF}$ and ground are resistors 50 and 52, which may be of equal resistance. The junction of resistors 50 and 52 is internally connected to the feedback pin. $V_{REF}$ is connected to the positive input of error amplifier 40. The negative input of error amplifier 40 is connected to the positive input of error amplifier 41. The negative input of error amplifier 41 is connected to ground. The feedback pin is connected to the junction 51 between the negative input of error amplifier 40 and the positive input of error amplifier 41.

Control signal line $V_C$ is coupled to current source 54. Error amplifier 40 is coupled to current source 54 through diode 56, which is poled in a direction to draw current from the current source. Error amplifier 41 is coupled to current source 54 through diode 58, which is poled in a direction to draw current from the current source.

In operation, $V_{FB}$ is at a positive voltage level for boost voltage conversion and at a negative voltage level for inverting voltage conversion. During boost operation the positive input to error amplifier 41 is greater than its negative input, which is grounded. The output of error amplifier 41 thus will be high, turning off diode 58. Error amplifier 41 is thus of no effect on $V_C$ during boost operation. $V_{FB}$, a function of feedback circuit resistors 16, 50 and 52, is applied to the negative input of error amplifier 40.

When $V_{FB}$ is less than $V_{REF}$, the output of error amplifier will be high to prevent conduction of current through diode 56. This condition corresponds to high load current converter operation. The current of current source 54 is completely directed to $V_C$. The switching regulator will deliver high current to the output in response to the resulting high level of $V_C$. When the output voltage increases during low load conditions such that $V_{FB}$ exceeds $V_{REF}$, the output of error amplifier 40 will be negative, rendering diode 56 conductive. Current from current source 54 will be diverted to error amplifier 40, thereby lowering the level of $V_C$. In response, the switching regulator will deliver lower current to the output. Thus $V_C$ will decrease in accordance with a decrease in load. The switching regulator functions in this manner in both current mode regulation and voltage mode regulation.

During inverting voltage conversion operation, $V_{OUT}$ is at negative polarity. The positive input to error amplifier 40, $V_{REF}$, is greater than the feedback voltage, $V_{FB}$, at its negative input. The output of error amplifier 40 thus will be high, turning off diode 56. Error amplifier 40 is thus of no effect on $V_C$ during inverting operation. During high load condition operation, the absolute value $V_{OUT}$ is lower than the nominal regulated level. $V_{FB}$ at the positive input to error amplifier 41 will be equal to or greater than its grounded negative input. The output of error amplifier 41 will be high to prevent conduction of current through diode 56. The current of current source 54 is completely directed to $V_C$. The switching regulator will deliver high current to the output in response to the resulting high level of $V_C$.

During low load conditions, $V_{OUT}$ becomes more negative such that voltage at the grounded negative input to error amplifier 41 exceeds the value of $V_{FB}$ applied to its positive input. The output of error amplifier 41 will be negative to render diode 58 conductive. Current from current source 54 will be diverted to error amplifier 41, thereby lowering the level of $V_C$. In response, the switching regulator will deliver lower current to the output.

The internal resistor 52 can replace the external resistor, such as resistor 18, conventionally used in a load feedback circuit. The circuit of FIG. 5 provides for appropriate regulation in accordance with load conditions in both boost and inverting operations. In both operations, current applied to the $V_C$ node by the feedback network is based on the resistance of internal resistors 50 and 52, external resistance 16 and the value of $V_{OUT}$. Only a single pin ($V_{FB}$) of the integrated circuit chip is necessary for implementing selection between boost converter or inverting converter operation.

Figure 6:
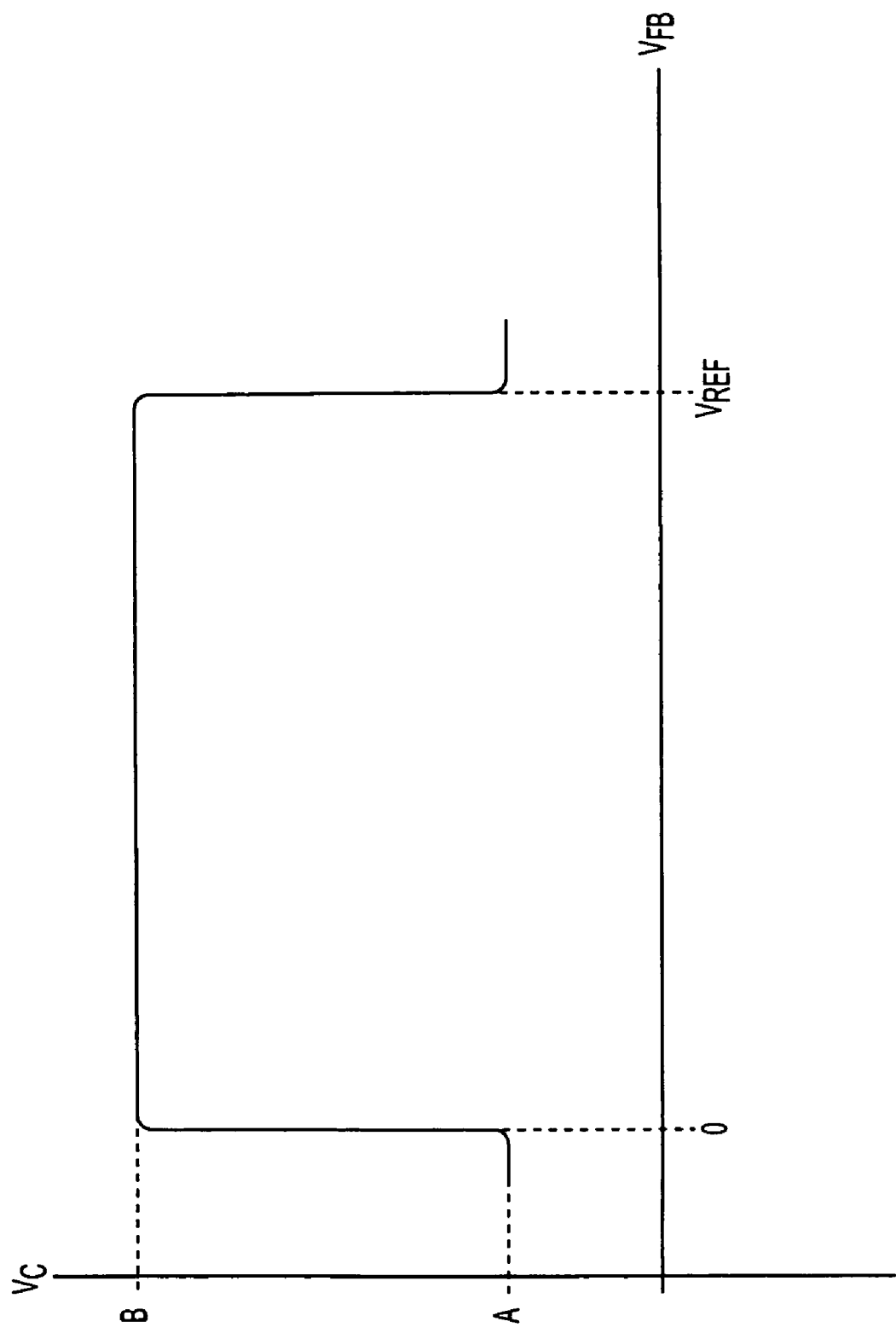
FIG. 6 is a waveform of a transfer function from a feedback node to a control node in the circuit of FIG. 5.

FIG. 6 is a waveform of a transfer function from the feedback node $V_{FB}$ to the $V_C$ node in the circuit of FIG. 5. The Y axis represents the voltage or current level at line $V_C$. The X axis represents the level at the $V_{FB}$ pin. At a $V_{FB}$ level of $V_{REF}$, the level of $V_C$ transitions steeply between levels A and B. This operation represents boost mode in which the high gain of error amplifier 40 causes $V_C$ to servo about the $V_{REF}$ feedback level. When $V_{FB}$ falls below the $V_{REF}$ level, $V_C$ assumes the high B level. When $V_{FB}$ is above the $V_{REF}$ level, the level of $V_C$ is driven at the lower A level. In inverting mode operation, the level of $V_C$ servos between levels A and B at zero feedback level by means of high gain error amplifier 41.

Figure 7:
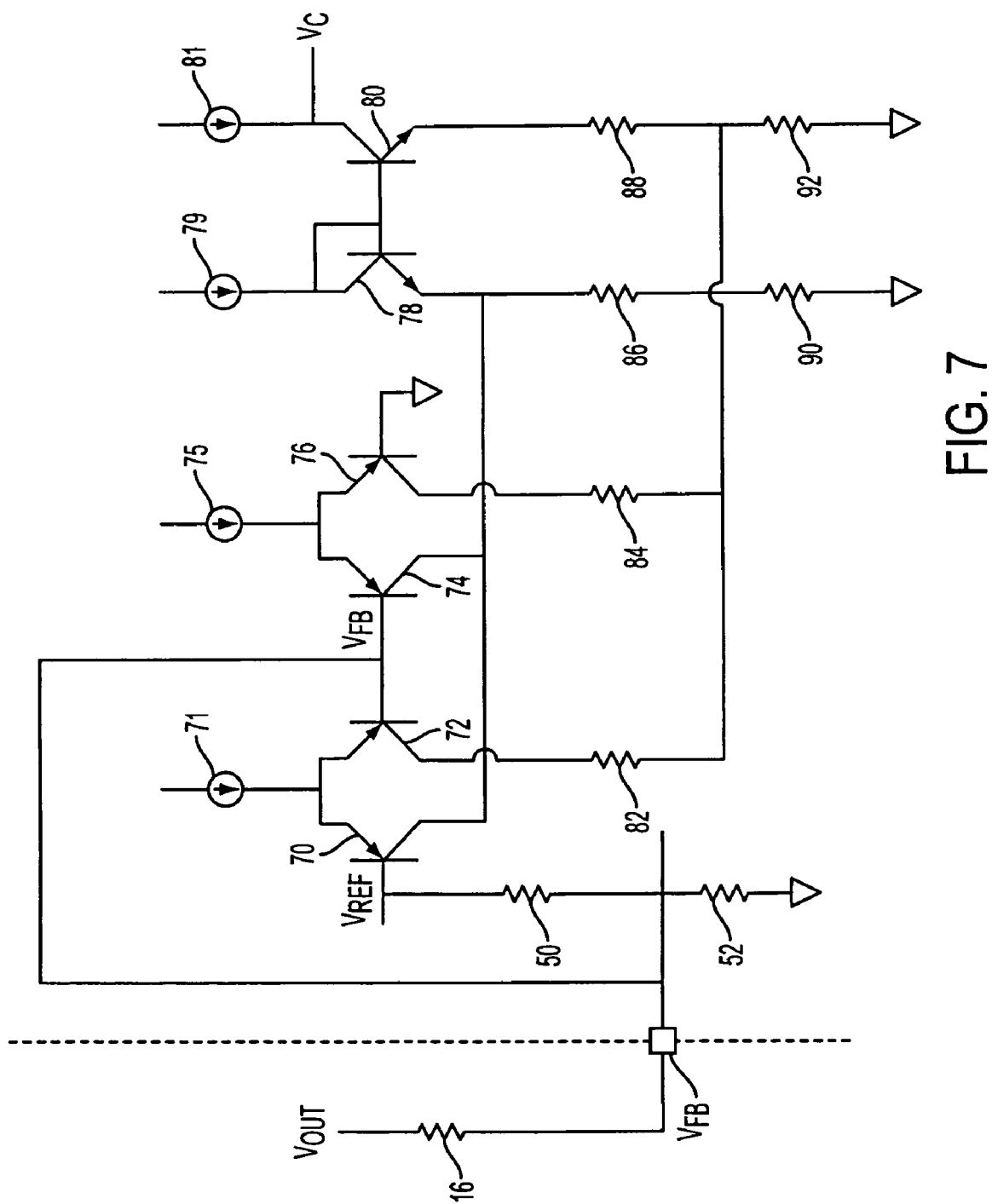
FIG. 7 is a circuit diagram by which the scheme of FIG. 5 may be implemented.

FIG. 7 is a circuit diagram for implementing the scheme of FIG. 5. The functionality of the error amplifiers 40 and 41 of FIG. 5 is obtained by the configuration of PNP transistors 70, 72, 74 and 76, and NPN transistors 78 and 80. Emitters of transistors 70 and 72 are connected together and to current source 71. Emitters of transistors 74 and 76 are connected together and to current source 75. The base of transistor 70 is connected to $V_{REF}$. The bases of transistors 72 and 74 are connected together and to $V_{FB}$. The base of transistor 76 is connected to ground.

The collector of transistor 78 is connected to its base and to current source 79. The collector of transistor 80 is coupled to current source 81, a junction therebetween producing the output $V_C$. The base of transistor 78 is connected to the base of transistor 80. Resistors 86 and 90 are connected in series between the emitter of transistor 78 and ground. Resistors 88 and 92 are connected in series between the emitter of transistor 80 and ground. The collectors of transistors 70 and 74 are connected to the emitter of transistor 78. The collectors of transistors 72 and 76 are connected to the junction between resistors 88 and 92, respectively via resistors 82 and 84. Transistors 78 and 80 are matched and are connected in a current mirror configuration.

In operation, transistors 70 and 72 steer current from current source 71 to the current paths in series with transistors 78 and 80. When $V_{FB}$ is higher than $V_{REF}$, most of the current traverses transistor 70. The current from current source 71 is then directly primarily to the series connected resistors 86 and 90. When $V_{FB}$ is lower than $V_{REF}$, most of the current traverses transistor 72. The current from current source 71 is then directed primarily to the series connected resistors 82 and 92.

Transistors 74 and 76 steer current from current source 75 to the current paths in series with transistors 78 and 80. When $V_{FB}$ is higher than ground, most of the current traverses transistor 76. The current from current source 75 is then directed primarily to the series connected resistors 84 and 92. When $V_{FB}$ is lower than ground, most of the current traverses transistor 74. Current from current source 75 is then directed primarily to the series connected resistors 86 and 90.

The values of current sources 71, 75, 79, and 81, and resistors 82, 84, 86, 88, 90, and 92 can be selected to obtain the boost mode and inverting mode operation transfer function illustrated in FIG. 6. As an example, the following values are set. Current sources 71 and 75 provide currents of 4 µamp and current sources 79 and 81 provide currents of 2 µamp. Resistors 82, 84, 86 and 88 are 20 kΩ and resistors 90 and 92 are 10 kΩ. $V_{REF}$ is set at 1.25 volt.

In boost operation, the voltage level of $V_{FB}$ that corresponds to the $V_C$ transition in the transfer function of FIG. 6 is 1.25 volt. At this value of $V_{FB}$, transistor 74 will be nonconductive, transistor 76 will conduct 4 µamp from current source 75, and transistors 70 and 72 will each conduct 2 µamp from current source 71. 2 µamp from current source 81 will traverse transistor 80. The current at resistor 92 is a superposition of 2 µamp from current source 71 via transistor 72, 4 µamp from current source 75 via transistor 76, and 2 µamp from current source 81 via transistor 80. The voltage at the emitter of transistor 80, $V_C$, is substantially the sum of the voltages across resistors 88 (40 mv) and 92 (80 mv), or 120 mv. Current of 4 µamp traverses resistors 86 and 90. The voltage at the emitter of transistor 78 is the sum of the voltages across resistors 86 (80 mv) and 90 (40 mv), or 120 mv. Transistors 78 and 80 are thus evenly balanced at the higher transition level.

As the load decreases, $V_{FB}$ increases above the 1.25 volt $V_{REF}$. Current through transistor 72 will decrease and current through transistor 70 will increase. As the current steered to resistor 92 from current source 71 decreases, $V_C$ decreases. As the load increases, $V_{FB}$ decreases. Current through transistor 72 will increase and current through transistor 70 will decrease. As the current steered to resistor 92 from current source 71 increases, $V_C$ increases.

In inverting mode operation, the voltage level of $V_{FB}$ that corresponds to the $V_C$ transition in the transfer function of FIG. 6 is 0 volt. At this value of $V_{FB}$, transistor 70 will be nonconductive, transistor 72 will conduct 4 μamp from current source 71, and transistors 74 and 76 will each conduct 2 μamp from current source 75. 2 μamp from current source 81 will traverse transistor 88. The current at resistor 92 is a superposition of 2 μamp from current source 81 via transistor 80, 4 μamp from current source 71 via transistor 72, and 2 μamp from current source 75 via transistor 76. The voltage at the emitter of transistor 80, $V_C$, is substantially the sum of the voltages across resistors 88 (40 mv) and 92 (80 mv), or 120 mv. Current of 4 μamp traverses resistors 86 and 90. The voltage at the emitter of transistor 78 is the sum of the voltages across resistors 86 (80 mv) and 90 (40 mv), or 120 mv. Transistors 78 and 80 are thus evenly balanced at the lower transition level.

As the load increases, $V_{FB}$ increases above ground level. Current through transistor 74 will decrease and current through transistor 76 will increase. As the current steered to resistor 92 from current source 75 increases, $V_C$ increases. As the load decreases, $V_{FB}$ decreases. Current through transistor 74 will increase and current through transistor 76 will decrease. As the current steered to resistor 92 from current source 75 decreases, $V_C$ decreases.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the transistor pairs depicted in FIG. 7 may be selected to match a particular ratio other than being evenly matched. Circuit elements of this figure may be selected to obtain different feedback voltage transition points, which can be correlated to various selected values of voltage regulation for boost mode and inverted mode operation. The functionality of the disclosed embodiments are applicable to supply voltages of negative polarity as well as positive polarity.

What is claimed is:

1. A voltage converter comprising:
   a switching circuit having an input node coupled to receive a supply voltage;
   regulator circuitry coupled to the switching circuit, the regulator circuitry selectively configurable to provide at an output node a regulated load voltage either with the same polarity as the supply voltage or with an inverted polarity relative to the supply voltage;
   a control circuit comprising an input node and a control signal output node coupled to the control input of the switching circuit to provide a control signal thereto; and
   a feedback circuit comprising a feedback node having a voltage level related to the load voltage, the feedback node coupled to the control circuit input node for regulation at both the same voltage polarity and inverted voltage polarity relative to the polarity of the supply voltage, wherein
   the switching circuit and the control circuit are formed on an integrated circuit having only one feedback pin through which the feedback node and the control circuit input node are coupled, and
   the control circuit generates the control signal to be proportional to the voltage at the feedback pin.

2. A voltage converter as recited in claim 1, wherein the regulated load voltage level is a boosted level having the same polarity as the supply voltage.

3. A voltage converter as recited in claim 1, wherein the feedback circuit further comprises a plurality of impedances configured electrically in series across the load.

4. A voltage converter as recited in claim 3, wherein the plurality of impedances is external to the integrated circuit, and the feedback node is coupled to the control circuit input node by the feedback pin.

5. A voltage converter as recited in claim 3, wherein one of the plurality of impedances is formed on the integrated circuit.

6. A voltage converter as recited in claim 1, wherein the control circuit further comprises first and second error amplifiers, and the feedback pin is coupled to a junction between a negative input of the first error amplifier and a positive input of the second error amplifier.

7. A voltage converter as recited in claim 6, wherein a positive input of the first error amplifier is coupled to an internal reference voltage line and the negative input of the second error amplifier is coupled to ground.

8. A voltage converter as recited in claim 7, wherein the control circuit further comprises:
   a current source coupled in series with the control signal output node;
   a first diode coupled between a junction of the current source and the control signal output node and the output of the first error amplifier; and
   a second diode coupled between a junction of the current source and the control signal output node and the output of the second error amplifier;
   wherein the first diode is connected in a configuration to draw current from the current source to the output of the first error amplifier when the feedback voltage is greater than the reference voltage, and the second diode is connected in a configuration to draw current from the current source to the output of the second error amplifier when the feedback voltage is less than ground voltage.

9. A voltage converter as recited in claim 1, wherein the control circuit further comprises:
   a first differential transistor pair coupled between a first current source and the control signal output node, the first differential pair transistors having control inputs coupled, respectively, to a first reference voltage and to the feedback node; and
   a second differential transistor pair coupled between a second current source and the control signal output node, the second differential pair transistors having control inputs coupled, respectively, to a second reference voltage and to the feedback node.

10. A voltage converter as recited in claim 9, wherein the first reference voltage has a positive polarity and the second reference voltage is ground level.

11. A method for controlling a voltage regulator that is selectively configurable to provide a regulated output load voltage either with the same polarity as the supply voltage or with an inverted polarity relative to the supply voltage, the method comprising the steps of:

deriving a feedback signal that varies with load voltage;

generating a control signal that is variable proportionately with load current; and applying the control signal to a switching circuit of the regulator, wherein the generating step comprises:

supplying a control current from a current source to a control circuit of the switching circuit; and diverting the current source current from the control circuit when the voltage of the feedback signal is greater than a first reference voltage and when the voltage of the feedback signal is less than a second reference voltage.

12. A method as recited in claim 11, wherein the first reference voltage has a positive polarity and the second reference voltage is ground level.

13. A method as recited in claim 11, wherein the switching circuit and the control circuit are formed on an integrated circuit having only one feedback pin;

and further comprising the step of applying the feedback signal
to the feedback pin during load voltage regulation at both the same polarity as the supply voltage or at an inverted polarity relative to the supply voltage.

14. A method as recited in claim 13, wherein the step of deriving a feedback signal comprises sensing voltage at a node of a feedback circuit, the feedback circuit comprising a first impedance element external to the integrated circuit and a second impedance element internal to the integrated circuit, the node joining the first and second impedance elements.

15. A method as recited in claim 11, wherein the regulated load voltage level is a boosted level having the same polarity as the supply voltage.

16. A method for controlling a voltage regulator that is selectively configurable to provide a regulated output load voltage either with the same polarity as the supply voltage or with an inverted polarity relative to the supply voltage, the method comprising the steps of:

deriving a feedback signal that varies with load voltage;

generating a control signal that is variable proportionately with load current; and applying the control signal to a switching circuit of the regulator, wherein the switching circuit and the control circuit are formed on an integrated circuit having only one feedback pin for regulation at both the same voltage polarity and inverted voltage polarity relative to the polarity of the supply voltage, and the generating step comprises:

applying the feedback signal to the feedback pin during load voltage regulation, supplying a control current from a current source to a control circuit of the switching circuit; and diverting the current source current from the control circuit when the voltage at the feedback pin is greater than a first reference voltage and when the voltage at the feedback pin is less than a second reference voltage.

17. A voltage converter as recited in claim 1, wherein the control circuit further comprises:

a current source providing current for generation of the control current; and diverting circuitry configured for diverting the current source current from the control circuit when the voltage at the feedback pin is greater than a first reference voltage and when the voltage at the feedback pin is less than a second reference voltage.

* * * * *